United States Patent [19]
Morrison et al.

[11] Patent Number: 5,988,748
[45] Date of Patent: Nov. 23, 1999

[54] AUTOMOTIVE SEAT BOTTOM ASSEMBLY

[75] Inventors: Gerald O. Morrison, Beverly Hills; Stephen Rybak, Birmingham; Richard Cramb, Livonia; Russell Davidson, Dearborn, all of Mich.

[73] Assignee: Lear Corporation, Southfield, Mich.

[21] Appl. No.: 08/940,142

[22] Filed: Sep. 29, 1997

Related U.S. Application Data

[63] Continuation-in-part of application No. 08/705,513, Aug. 29, 1996, abandoned
[60] Provisional application No. 60/007,548, Nov. 27, 1995, and provisional application No. 60/016,775, May 7, 1996.

[51] Int. Cl.$^6$ ........................................................ B60N 2/10
[52] U.S. Cl. .................... 297/328; 297/284.11; 297/313; 297/452.41; 297/440.22; 248/157; 248/631
[58] Field of Search ............................... 297/284.11, 313, 297/325–328, 344.12, 344.15, 344.18, 344.2, 452.41, 440.22; 248/157, 631, 108; 108/57, 12, 147

[56] References Cited

U.S. PATENT DOCUMENTS

| | | | |
|---|---|---|---|
| 554,672 | 2/1896 | Fuller | 297/344.18 X |
| 1,439,584 | 12/1922 | Textorius | 108/147 |
| 2,587,094 | 2/1952 | Berg et al. | 108/147 X |
| 3,267,882 | 8/1966 | Rapson et al. | 108/57.12 X |
| 4,509,796 | 4/1985 | Takagi . | |
| 5,310,154 | 5/1994 | Ueda et al. . | |
| 5,439,271 | 8/1995 | Ryan . | |
| 5,607,204 | 3/1997 | Gryp | 297/284.11 |

Primary Examiner—Peter R. Brown
Attorney, Agent, or Firm—MacMillan, Sobanski &Todd, LLC

[57] ABSTRACT

A front seat assembly having a seat bottom assembly and a seat back pivotally attached to the seat bottom assembly. The seat bottom assembly includes a pair of fixed rails extending fore and aft and being laterally spaced across a vehicle from one another. Brackets are attached to the fixed rails for attachment to the vehicle. A slide rail is supported by each of the fixed rails for fore and aft movement relative to the fixed rails. Front and rear cross beams interconnect the slide rails for supporting a number of components. A support sheet, having a pair of openings, extends between and is supported by the cross beams. A seat pan, having a front section and a rear section, is disposed above the support sheet for supporting an occupant. A pair of projections are pivotally connected to and extend from the seat pan for sliding engagement within the pair of openings in the support sheet. The projections are disposed between the front and rear sections of the seat pan for allowing the seat pan to pivot about the projections relative to the support sheet. In the embodiment shown, front and rear bladders are utilized between the support sheet and the front and rear sections of the seat pan for raising either or both of the front and rear sections.

20 Claims, 10 Drawing Sheets

AUTOMOTIVE SEAT BOTTOM ASSEMBLY

RELATED APPLICATION

This application is a Continuation-In-Part of application Ser. No. 08/705,513, filed on Aug. 29, 1996, abondoned which claims the benefit of U.S. Provisional Application Ser. No. 60/007,548, filed on Nov. 27, 1995, and U.S. Provisional Application Ser. No. 60/016,775, filed on May 7, 1996.

TECHNICAL FIELD

The subject invention relates to automotive seat assemblies and, more specifically, to a seat bottom assembly of a front seat.

BACKGROUND OF THE INVENTION

By way of background, vehicle front and rear seat assemblies typically include a right and left seat assembly having a seat bottom portion, a pivotal seat back, a seat track assembly and a center console or arm rest assembly positioned between the right and left seat assemblies. Typically, each of the components comprising the seat assemblies must be independently mounted in the vehicle, that is to the vehicle floor pan. More specifically, the seat bottom and seat back are mounted to a pair of seat tracks which must then be mounted to the vehicle floor pan for each individual seat assembly. Similarly, the center console is commonly secured between the seat assemblies and mounted to the vehicle floor pan. Other components of a vehicle seat assembly including seat adjustment means, seat belt restraint assemblies, rear hatch compartment panels, etc. must be individually mounted to the vehicle seat assembly and are often independently secured to the vehicle floor pan or vehicle side walls.

Additionally, the front seat assemblies for automobiles are designed for each model of automobile and are only usable in that model. The seat assembly for each model is fabricated from components specifically designed for that particular seat assembly and the seat assemblies for opposite sides of the vehicle frequently differ, sometimes requiring the two seats to be installed in the vehicle in separate procedures.

There are seat assemblies known in the prior art which include two seats as a unit, U.S. Pat. Nos. 4,526,421 to Brennan et al and 5,385,384 to Gierman et al; single seat assemblies which include components for rapid attachment to the vehicle body, U.S. Pat. No. 5,443,239 to Laporte; and a single seat assembly having minimal components, U.S. Pat. No. 5,468,050 to Hall et al.

However, there remains a need for an improved design which is fabricated of a minimum of components which are universally used in seats from model to model, yet retaining the flexibility to individually stylize the seats from model to model. Attendant to those design objectives is the requirement for a basic or universal seat frame assembly which incorporates an easily manufactured and assembled seat bottom assembly.

SUMMARY OF THE INVENTION AND ADVANTAGES

A seat bottom assembly having a pair of fixed rails extending fore and aft and being laterally spaced across a vehicle from one another. A plurality of brackets are attached to the fixed rails for attachment to the vehicle. A slide rail is supported by each of the fixed rails for fore and aft movement relative to the fixed rails. Front and rear cross beams interconnect the slide rails for supporting a number of components. A support sheet extends between and is supported by the cross beams. At least one opening is formed within the support sheet. A seat pan, having a front section and a rear section, is disposed above the support sheet for supporting an occupant. At least one projection is connected to and extends from the seat pan for sliding engagement within the opening in the support sheet wherein the sections of the seat pan may move vertically relative to the support sheet.

Accordingly, the subject invention provides for a simplified seat bottom assembly wherein the seat pan is easily and effectively attached to the support sheet. In addition, the seat pan can move vertically relative to the support sheet without the need for complicated and expensive linkage mechanisms.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
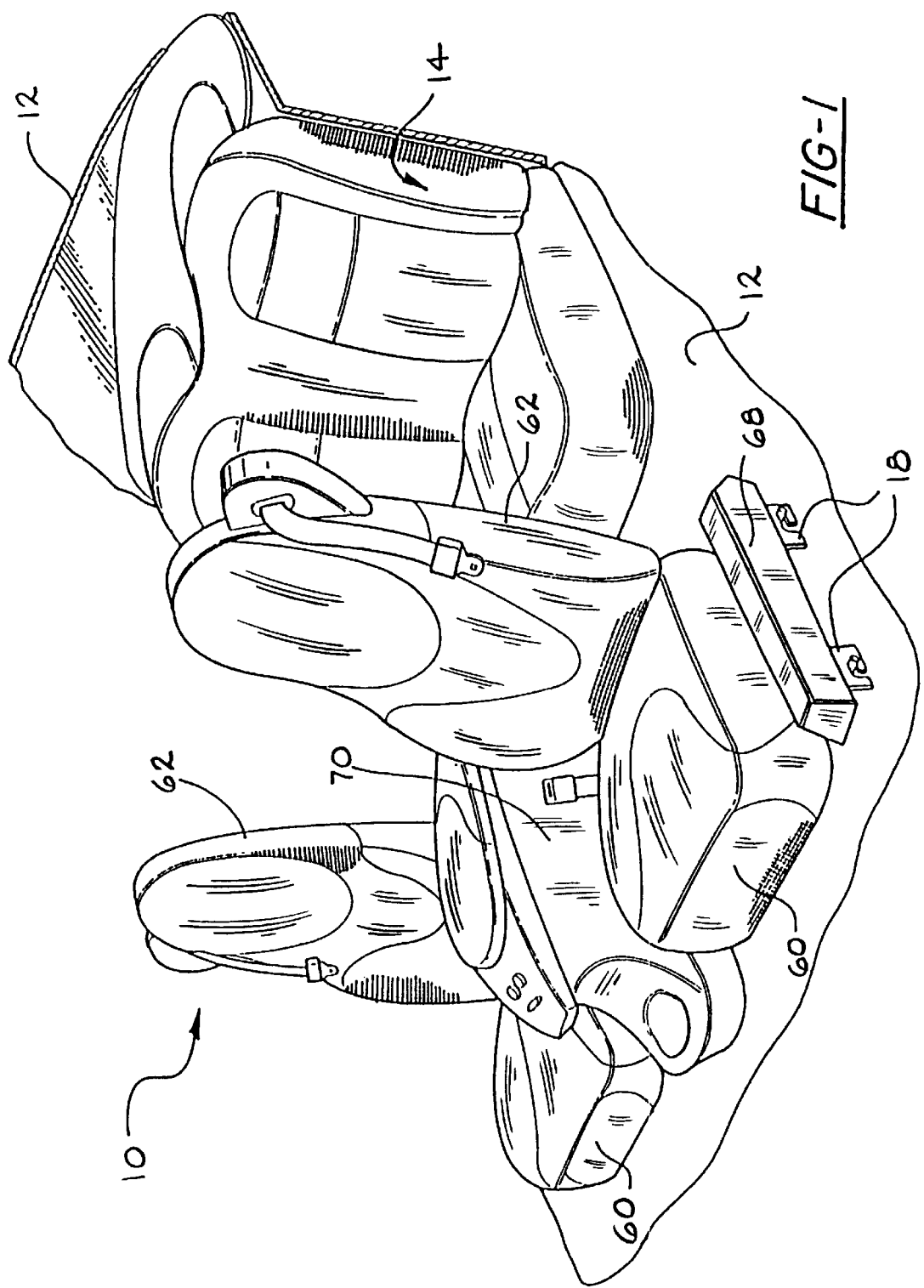
FIG. 1 is a perspective view of the interior of an automobile showing a rear seat assembly in combination with a front seat assembly of the subject invention.
Figure 2:
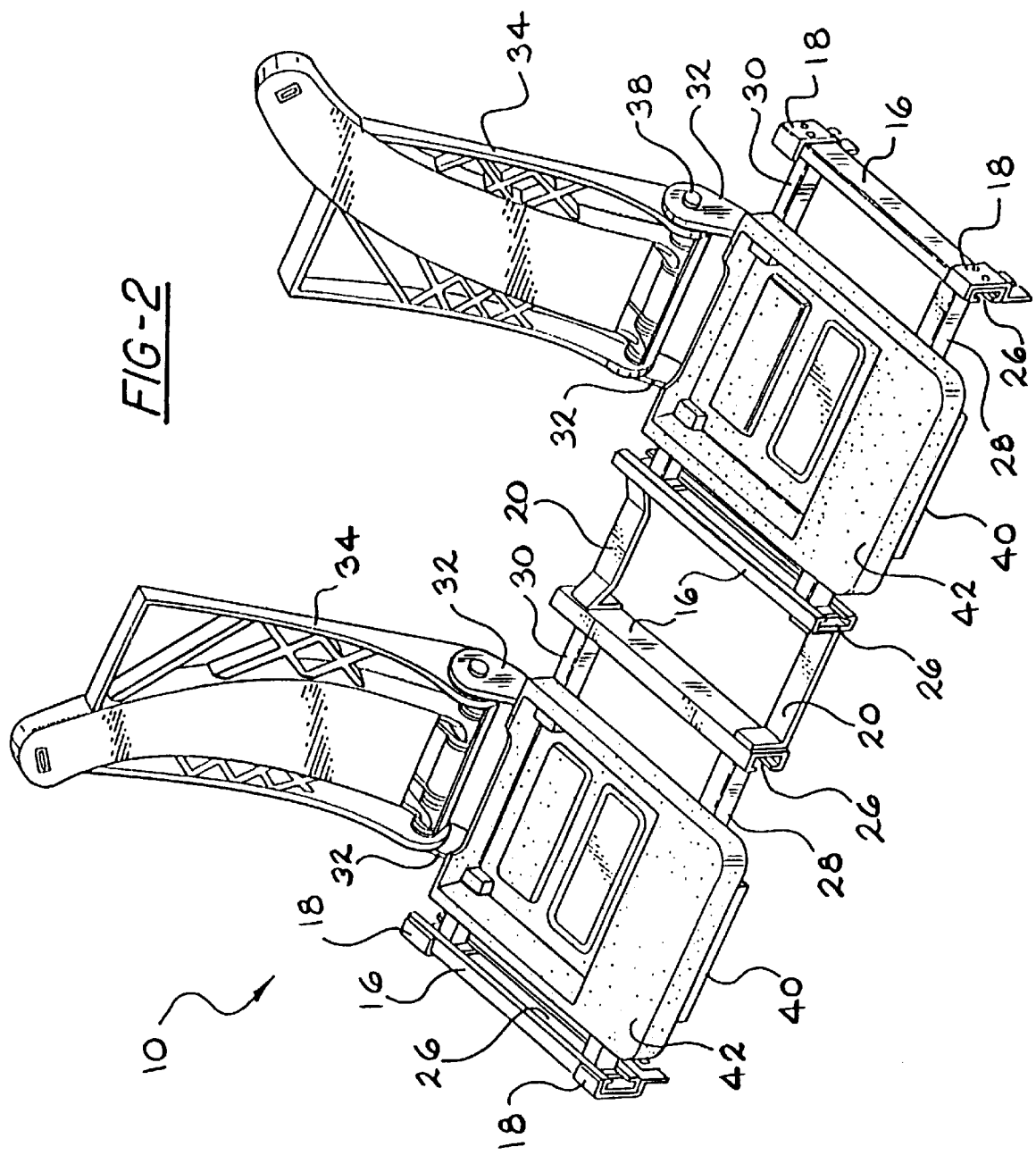
FIG. 2 is a perspective view of the support components of the front seat assembly of the subject invention.
Figure 3:
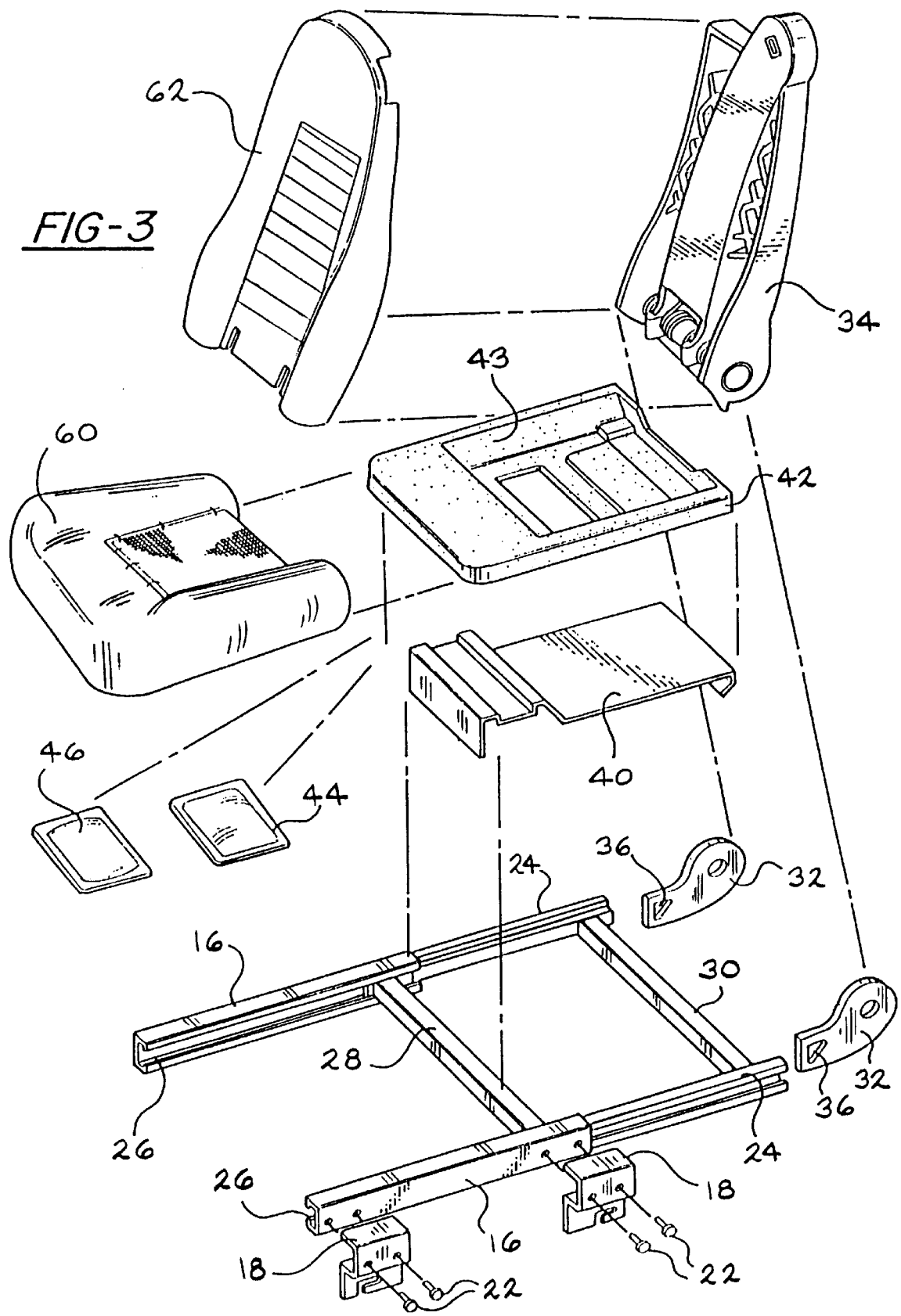
FIG. 3 is an exploded perspective view of one occupant seat of the front seat assembly of the subject invention.

Referring to the Figures, wherein like numerals indicate like or corresponding parts throughout the several views, a front seat assembly is generally shown at 10. The assembly 10 is to be installed as a unit in a vehicle 12 in front of a rear seat assembly 14.

The seat assembly 10 includes a pair of fixed rails 16 extending fore and aft and being laterally spaced across the vehicle 12 from one another. A plurality of brackets 18 and 20 are attached by rivets 22, or the equivalent, to the fixed rails 16 for attachment to the vehicle 12. Preferably, the brackets 18 include L-shaped slots which latch onto hooks 19 which extend from the vehicle 12. A slide rail 24 is supported by each of the fixed rails 16 for fore and aft movement relative to the fixed rails 16. One of the fixed 16 and slide 24 rails being C-shaped channels with the other of the fixed 16 and slide 24 rails being slidably disposed in the C-shaped channel. More specifically, the fixed rails 16 comprise the C-shaped channels having openings 26 which face one another and the slide rails 24 are slidably disposed in the C-shaped channels defining the fixed rails 16. Although not shown, roller or ball bearings may support the slide rails 24 in the fixed rails 16.

A pair of front 28 and rear 30 cross beams interconnect the slide rails 24 for supporting all of the remaining components of a first seat supported totally on the cross beams 28 and 30. The cross beams 28 and 30 extend through the openings 26 in the C-shaped channels defining the fixed rails 16 with the ends thereof attached to the slide rails 24, which are disposed inside the C-shaped channels.

Figure 4:
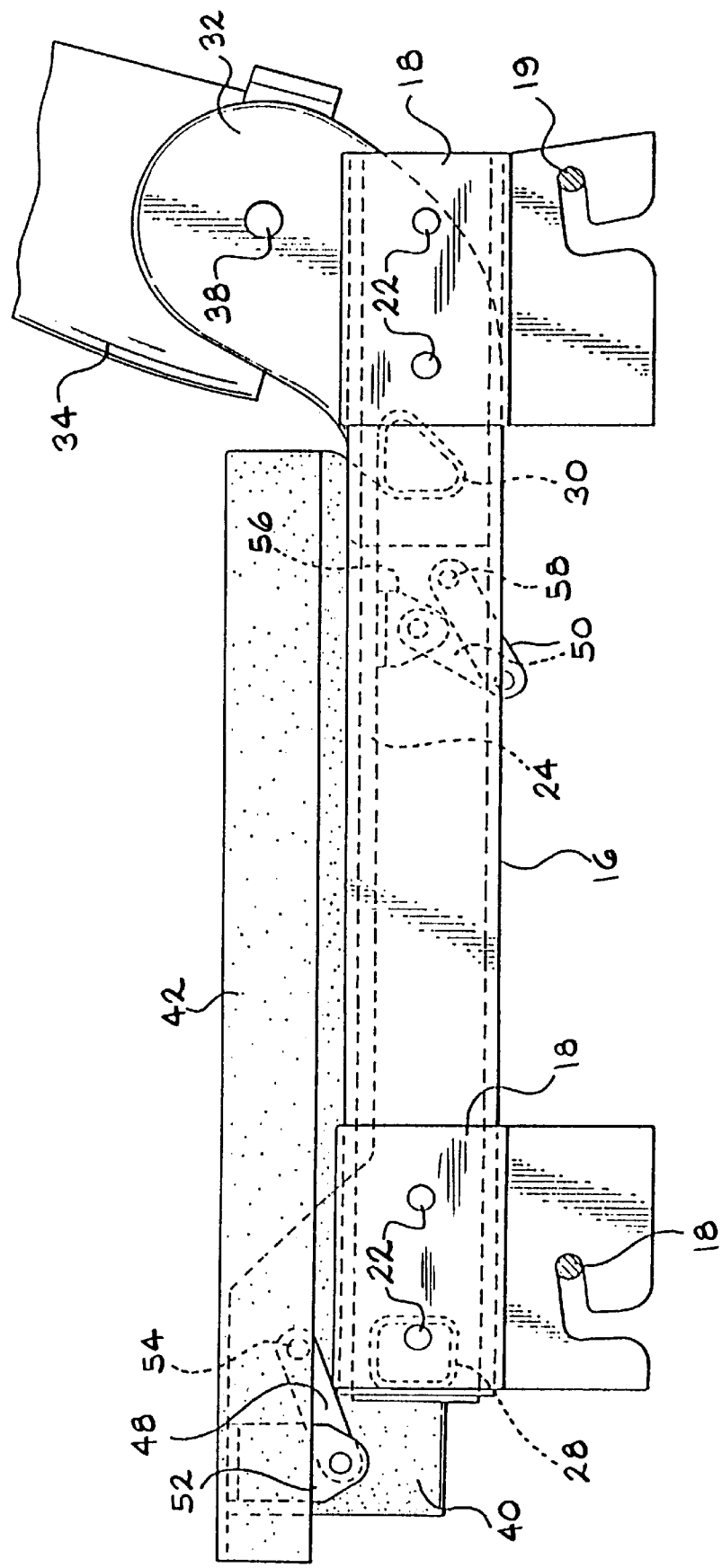
FIG. 4 is a fragmentary side view of the seat assembly of the subject invention.
Figure 5:
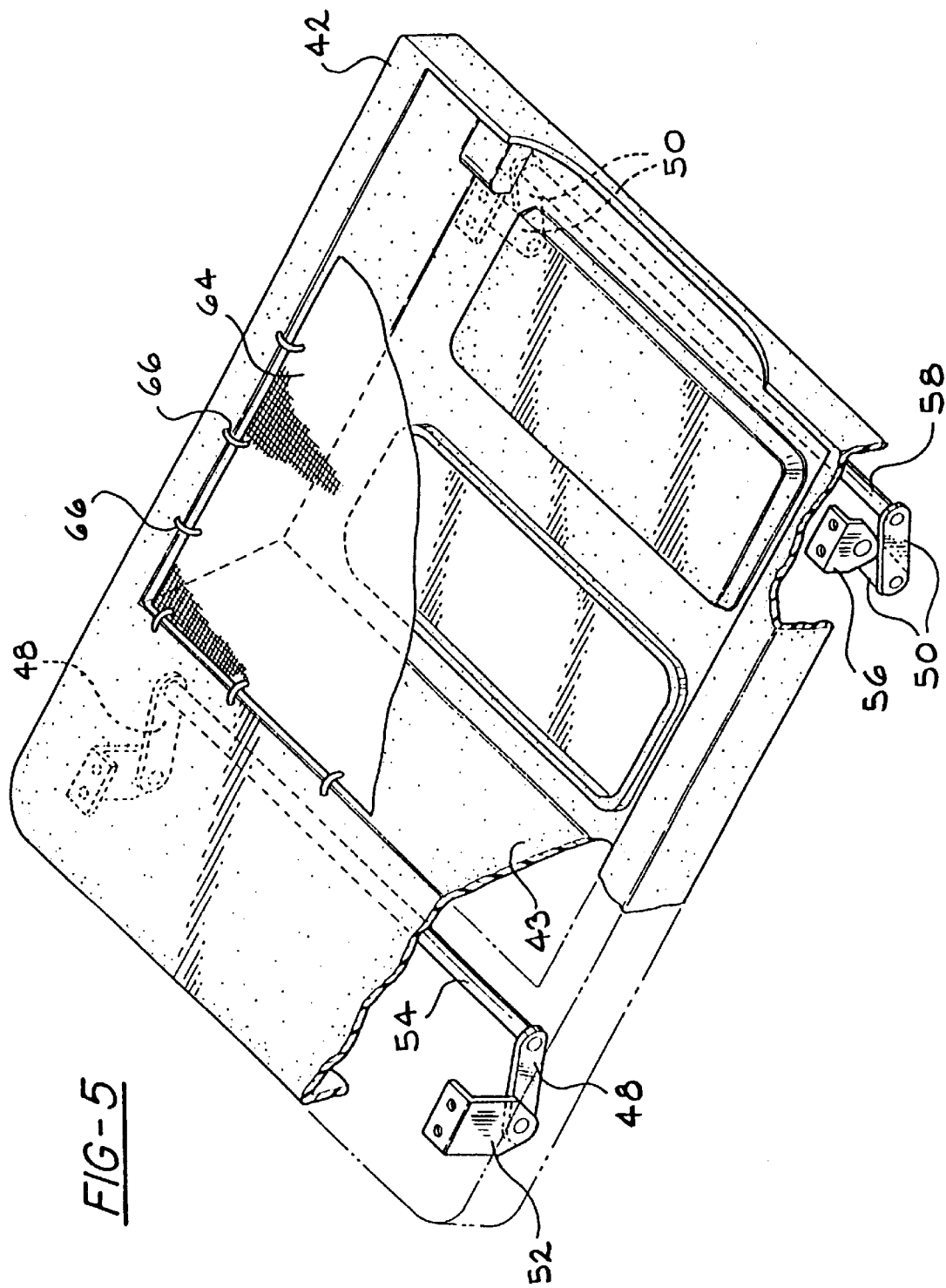
FIG. 5 is a perspective view, partially broken away and in cross section, of the occupant supporting component of the subject seat assembly.

A pair of seat back flanges 32 support a seat back 34. The rear cross beam 30 has an irregular cross section, i.e., triangular, as best shown in phantom lines in FIG. 4. The cross beams 28 and 30 are hollow tubes and provide torsional strength, particularly for the seat back flanges 32. Each of the seat back flanges 32 has an irregular or triangular opening 36 complementary to and surrounding the rear cross beam 30 for supporting the seat back 34 on the rear cross beam 30. Appropriate pivot pins 38 interconnect the seat back 34 and the flanges 32 for reclining movement of the seat back 34. The specifics of the seat back 34 form the subject matter of an independent invention disclosed and claimed in co-pending application Ser. No. 08/705,420 filed on Aug. 29, 1996 and assigned to the assignee hereof.

A support sheet 40 extends between and is supported by the cross beams 28 and 30. The support sheet 40 may be attached to the cross beams 28 and 30 by fasteners or spot welding, or the equivalent. The support sheet 40 is cupped at the rear to extend around the rear cross beam 30 and has a platform at the front edge.

A seat pan 42 is disposed above the support sheet 40 for supporting an occupant over a recess 43. A rear bladder 44 and a front bladder 46 are disposed between the sheet 40 and the pan 42 for raising and lowering the respective back and front of the pan 42 relative to the sheet 40 for adjusting the position of the seat. As will be appreciated, an appropriate pump and electrical drive motor with associated controls will be included in the seat assembly 10 to inflate and deflate the respective bladders 44 and 46.

A pair of front linkages 48 interconnect the pan 42 and the slide rails 24 for guiding the raising and lowering movement of the front of the pan 40. Two sets of rear linkages 50 interconnect the pan 42 and the slide rails 24 for guiding raising and lowering movement of the rear of the pan 42. More specifically, the pair of front linkages 48 are rotatably connected to brackets 52 which are, in turn, secured to the pan 42 and are interconnected by a rod 54. The rod 54 is non-rotatably secured to the linkages 48 so that the linkages 48 rotate in unison to keep both sides of the seat at the same vertical height. The rod 54 is rotatably support by and above the slide rails 24. In a similar fashion, one of the rear links of each pair 50 is connected to the pan 42 by a bracket 56 with the other link of each pair 50 secured to a rod 58, which is, in turn, rotatably supported by and between the slide rails 24 whereby the rear of the seat moves up and down in unison from side to side.

The front seat assembly 10 includes second pairs of fixed 16 and slide 24 rails and interconnecting cross beams 28 and 30 defining a second seat. The brackets 20 therefore include frame members 20 interconnecting the inside slide rails 24 of the first and second seat assemblies for defining the front seat assembly 10 which may be installed into the vehicle 12 as one unit. In other words, a robot could move the entire finished seat assembly 10 through the door opening in the vehicle 12 and precisely connect the brackets 18 to the hooks 19 and the frame members 20 to similar connecting devices.

In accordance with the component philosophy, a stylized seat bottom trim 60 is supported on the pan 42. In a similar fashion, a stylized back trim 62 is supported on the seat back 34. The trim components 60 and 62 are secured in place by appropriate quick fasteners (not shown), e.g., screws. Different trim components 60 and 62 may be utilized for different color vehicles and for different models of vehicles.

An occupant support means 64 is disposed in the recess 43 of the pan 42 for cushioning support of an occupant. More specifically, the occupant support means 64 comprises a flexible woven sheet suspended across the recess by rings 66 and provides a soft support for the occupant.

The outermost cooperating pairs of the fixed 16 and slide 24 rails are disposed laterally of or beside the bottom trim 60 and a cover 68 is disposed over the laterally disposed pair of fixed 16 and slide 24 rails. A center console 70 is supported on the frame members 20 between the first and second seat assemblies.

Alternatively, referring to FIGS. 6 through 13, another embodiment of the front seat assembly is generally shown at 100. The front seat assembly 100 includes a seat bottom assembly, generally shown at 102, and a seat back 104 pivotally attached to the seat bottom assembly 102.

Figure 6:
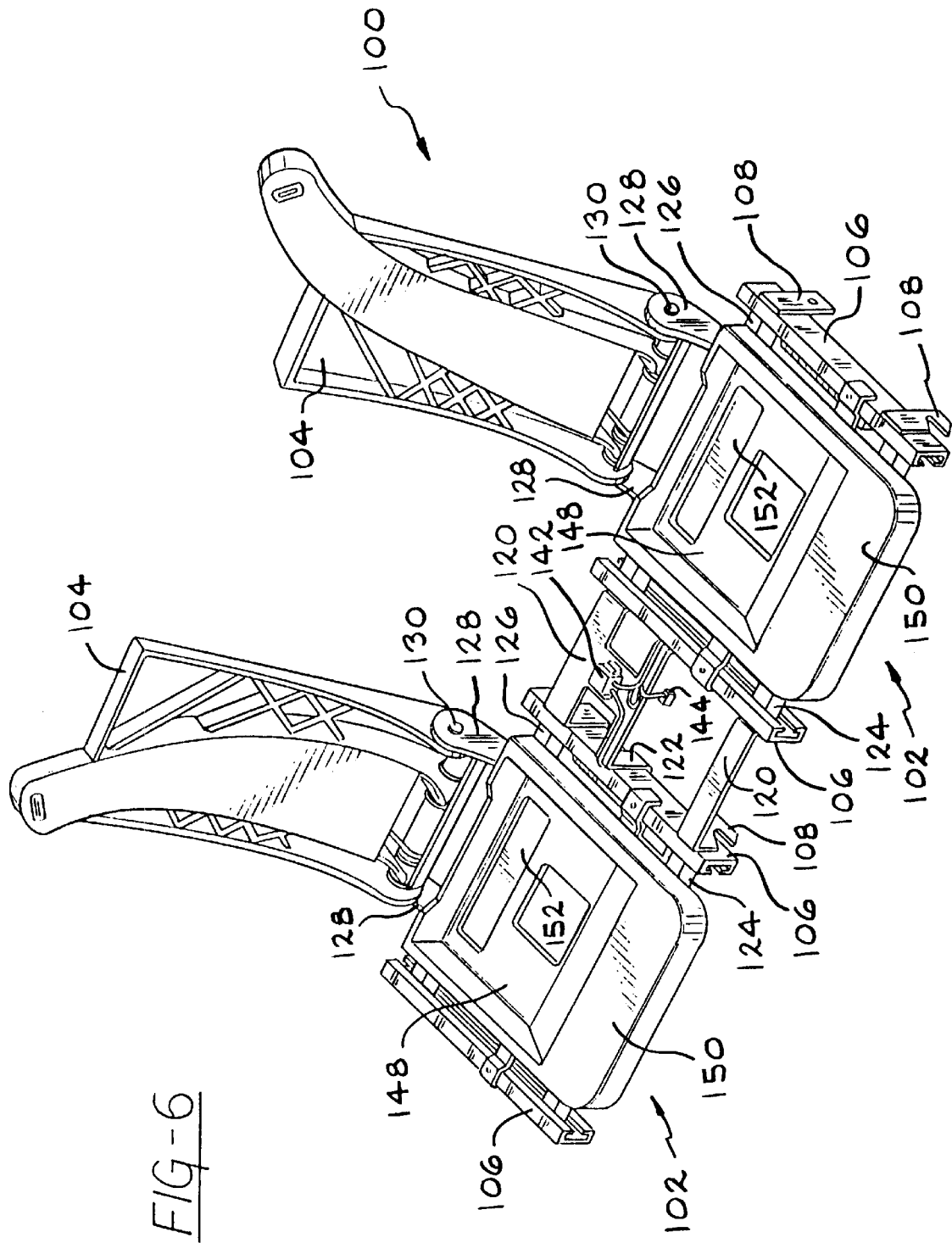
FIG. 6 is a perspective view of an alternative embodiment generally showing the support components of a front seat assembly.
Figure 7:
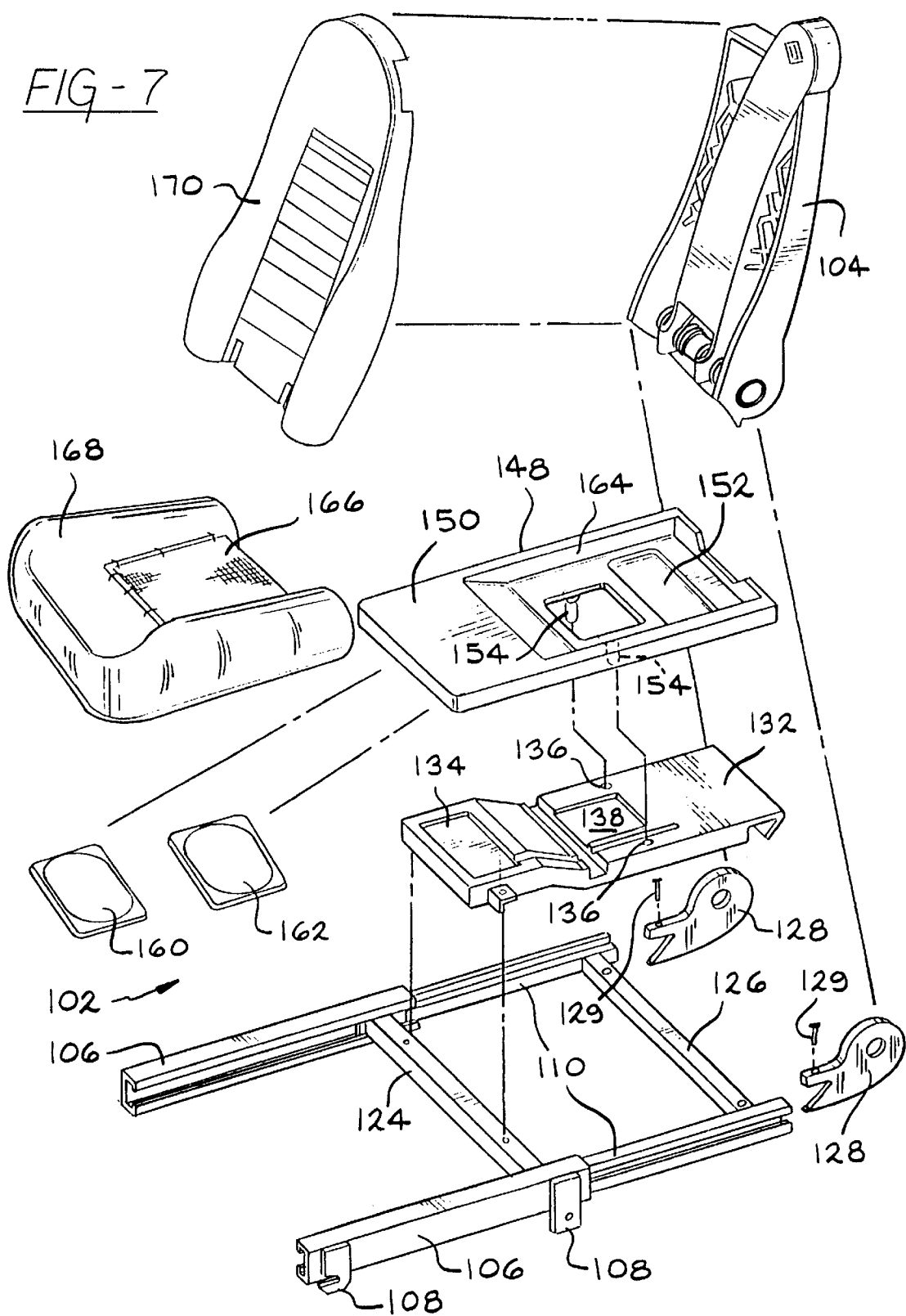
FIG. 7 is an exploded perspective view showing one occupant seat of the front seat assembly incorporating the subject invention of the alternative embodiment.
Figure 8:
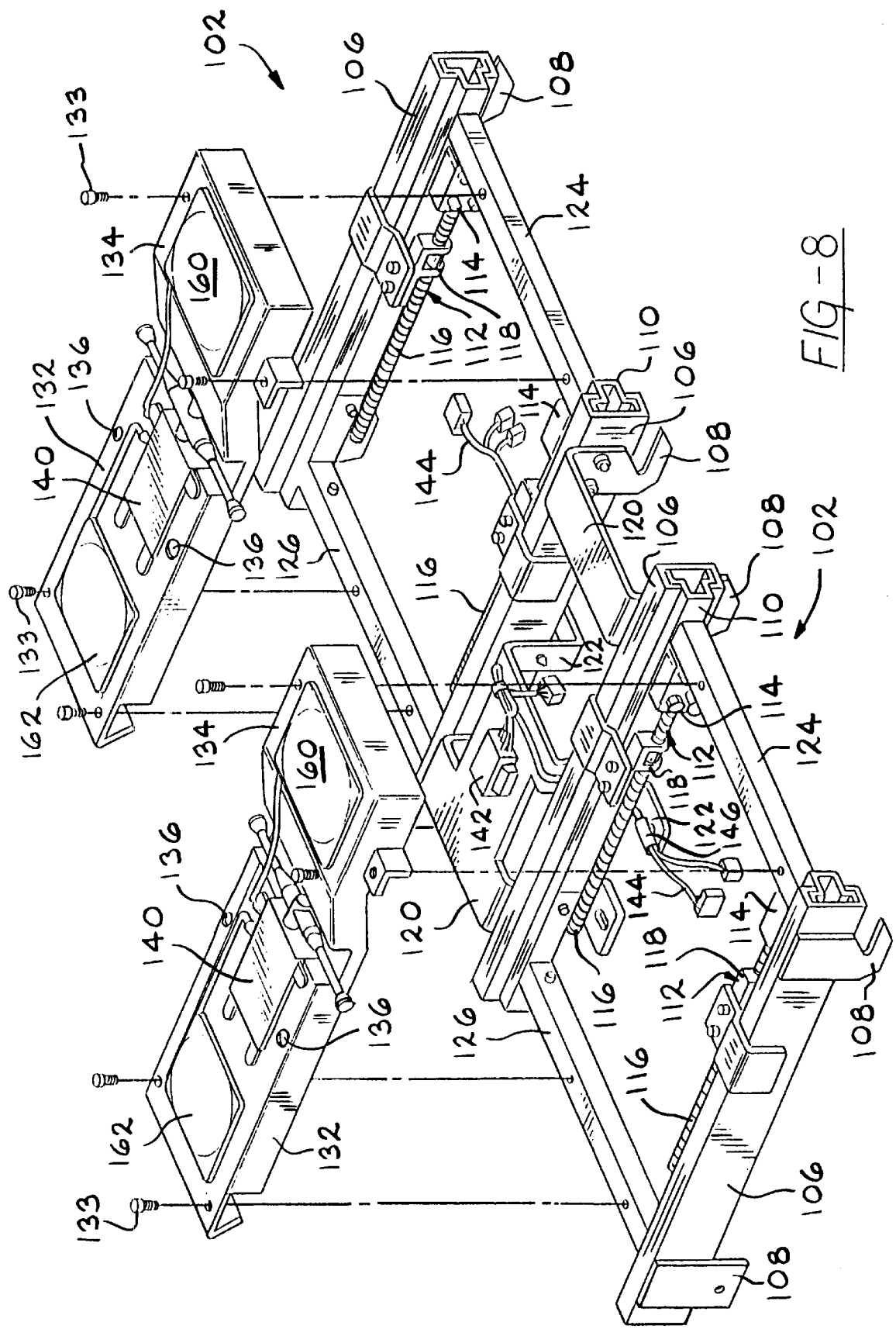
FIG. 8 is an exploded perspective view of a seat bottom assembly of the alternative embodiment.

Referring specifically to FIGS. 6, 7, and 8, the seat bottom assembly 102 includes a pair of fixed rails 106 extending fore and aft and being laterally spaced across a vehicle (not shown) from one another. A plurality of brackets 108 are attached to the fixed rails 106 for attachment to the vehicle. Preferably, the front brackets 108 include C-shaped slots which latch onto hooks (not shown) extending from the vehicle. A slide rail 110 is supported by each of the fixed rails 106 for fore and aft movement relative to the fixed rails 106. As best shown in FIG. 8, the slide rails 110 are actuated by a power track mechanism 112. The track mechanism 112 includes a gearbox 114 mounted to the slide rail 110 having a rotatable screw drive 116 extending therefrom. A stationary nut 118 is mounted to the fixed rails 106 and engages the screw drive 116. As appreciated by those skilled in the art, other components are necessary for the proper operation of this track mechanism 112 which are not disclosed nor do they form any part of the claimed subject matter.

In the embodiment shown, the front seat assembly 100 has two seat bottom assemblies 102 interconnected by frame members 120. Specifically, the frame members 120 interconnect two inner fixed rails 106. The front frame member 120 includes a pair of C-shaped slots which latch onto the hooks extending from the vehicle. The rear frame member 120 includes a pair of guide flanges 122 which extend below the inner fixed rails 106 toward the outer fixed rail 106.

Front 124 and rear 126 cross beams interconnect the slide rails 110 for supporting a number of components. The components supported on the cross beams 124, 126 are discussed hereinbelow and include but are not limited to the seat bottom assembly 102 and the seat back 104.

A pair of seat back flanges 128 support the seat back 104 on the rear cross beam 126. The seat back flanges 128 are configured to mate with the configuration of the rear cross beam 126. Specifically, a bolt 129 secures each of the flanges 128 to the rear cross beam 126. The bolt 129 passes through a portion of the flange 128 and then into the rear cross beam 126. The cross beams 124, 126 are hollow tubes and provide torsional strength, particularly for the seat back flanges 128. Appropriate pivot pins 130 interconnect the seat back 104 and the flanges 128 for reclining movement of the seat back 104.

As best shown in FIGS. 7 and 8, a support sheet 132 extends between and is supported by the cross beams 124, 126. The support sheet 132 may be attached to the cross beams 124, 126 by fasteners 133 or spot welding or the equivalent. The support sheet 132 is cupped at the rear to extend around the rear cross beam 126 and has a platform 134 at the front edge. At least one opening 136 is formed within the support sheet 132. In addition, an integral recess 138 is formed within the support sheet 132 to house a motorized component 140 for the seat bottom assembly 102. Specifically, the motorized component 140 is disposed in the recess 138 along the top surface of the support sheet 132. It is advantageous to have the motorized component 140 above the floor of the vehicle. This allows for added storage under the seat bottom assembly 102. In addition, the drive mechanism, hoses, etc. of the motorized component 140 are not in danger of inadvertent disconnection or damage. The specifics of the motorized component 140 form the subject matter of an independent invention disclosed and claimed in co-pending application Ser. No. (65,467-372) filed on, 1997 and assigned to the assignee hereof.

Figure 9:
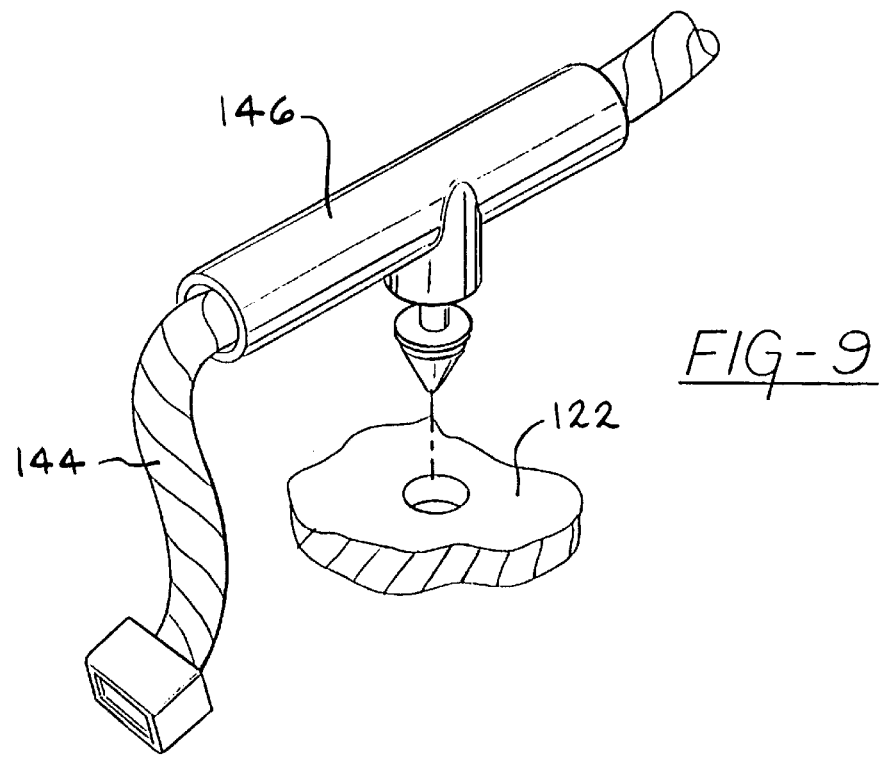
FIG. 9 is an enlarged perspective view of a cable fastener employed in the seat bottom assembly.

An electrical juncture box 142 is mounted to the rear frame member 120. A number of wires 144 extend from the box 142 along the guide flanges 122 and connect into the motorized component 140 to provide electrical energy to this component 140. As also shown in FIG. 9, a cable fastener 146 is mounted to each of the guide flanges 122 to assist in routing the wires 144 to the motorized component 140. The cable fastener 146 is utilized to keep the wires 144 from interfering with the other components of the seat bottom assembly 102 and to ensure that the wires 144 do not kink or otherwise deform.

Figure 10:
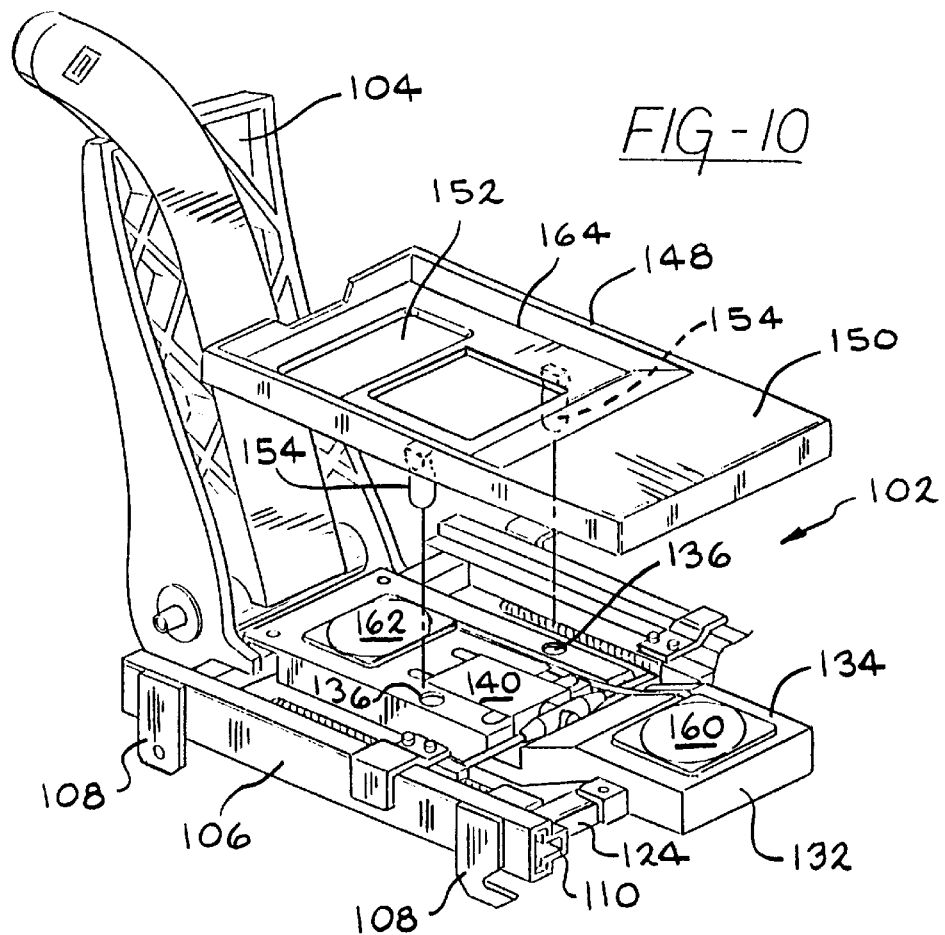
FIG. 10 is an exploded perspective view showing one occupant seat of the front seat assembly incorporating the subject invention of the alternative embodiment.
Figure 11:
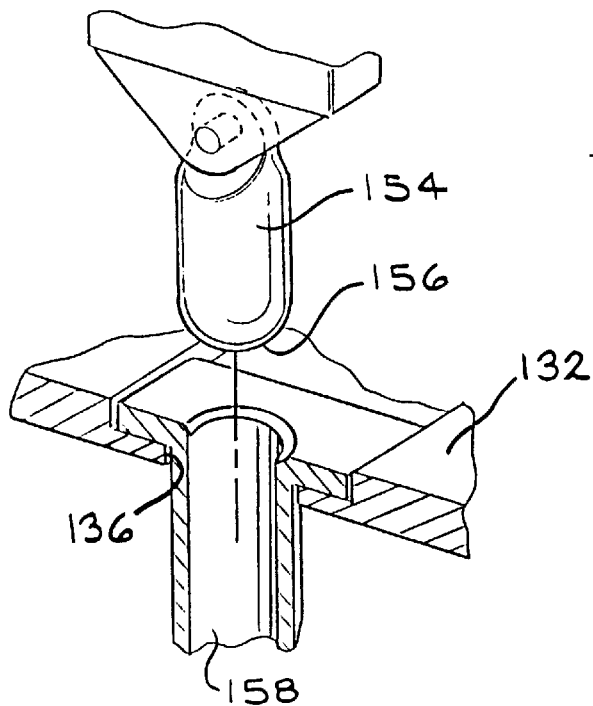
FIG. 11 is an enlarged view of the subject invention of the alternative embodiment.

As best shown in FIGS. 7, 10 and 11, a seat pan 148, having a front section 150 and a rear section 152, is disposed above the support sheet 132 for supporting an occupant (not shown). At least one projection 154 is connected to and extends from the seat pan 148 for sliding engagement within the opening 136 in the support sheet 132 wherein the sections 150, 152 of the seat pan 148 may move vertically relative to the support sheet 132. The projection 154 is pivotally connected to the seat pan 148 for allowing selective pivotal movement of the sections 150, 152 of the seat pan 148 relative to the support sheet 132. In other words, the front 150 and rear 152 sections may be moved independently of each other or in unison. In the embodiment shown, two projections 154 extend from the seat pan 148 for sliding engagement with two corresponding openings 136 in the support sheet 132.

The projection 154 as shown in FIG. 11 is a cylindrical finger 154 having a parabolic distal end 156. An annular sleeve 158 is disposed within the opening 136 in the support sheet 132 for receiving the cylindrical finger 154 of the seat pan 148. The sleeve 158 is designed such that the finger 154 can effectively slide within the sleeve 158. In the embodiment shown, the sleeve 158 is of a different material than the support sheet 132, for example plastic.

As best shown in FIGS. 7, 8, and 10 at least one bladder 160, 162 is disposed between the support sheet 132 and the seat pan 148 for raising and lowering at least one of the front 150 and rear 152 sections of the seat pan 148 relative to the support sheet 132. Specifically, in the embodiment shown, a front bladder 160 is disposed between the platform 134 of the support sheet 132 and the front section 150 of the seat pan 148 for raising and lowering the front section 150 relative to the support sheet 132. In addition, a rear bladder 162 is disposed between the rear of the support sheet 132 and the rear section 152 of the seat pan 148 for raising and lowering the rear section 152 relative to the support sheet 132. The two openings 136 in the support sheet 132 are formed between the front 160 and rear 162 bladders. In the embodiment shown, the openings 136 are formed on each side of the integral recess 138 within the support sheet 132 which houses the motorized component 140. Accordingly, the projections 154 are disposed between the front 150 and rear 152 sections of the seat pan 148 to align with the openings 136 and allow the seat pan 148 to pivot about the projections 154 relative to the support sheet 132. As appreciated by those skilled in the art, the motorized component 140 may have an appropriate pump and electrical drive motor with associated controls for inflating and deflating the respective bladders 160, 162. Hence, the front section 150 or rear section 152 or both sections 150, 152 of the seat pan 148 may be raised or lowered dependent upon the occupants demands.

As best shown in FIGS. 7 and 10 the seat pan 148 includes a recess 164 and an occupant support member 166 disposed in the recess 164 for cushioning support of the occupant. The occupant support member 166 comprises a flexible sheet suspended across the recess 164 which provides a soft support for the occupant. A stylized seat bottom trim 168 can be supported on the seat pan 148. In a similar fashion, a stylized back trim 170 can be supported on the seat back 104.

Figure 12:
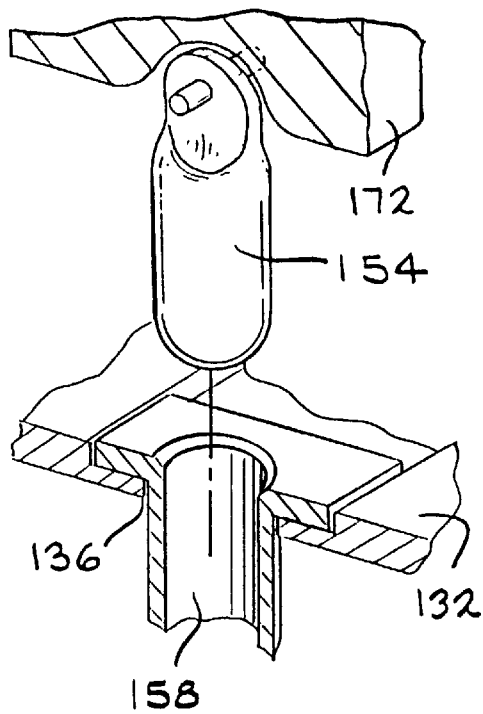
FIG. 12 is an enlarged view of another alternative embodiment of the subject invention.

FIG. 12 shows another embodiment of the projection 154 wherein the projection 154 is recessed in a projection housing 172 mounted to the seat pan 148 for limiting the pivotal movement of the projection 154 relative to the seat pan 148. The projection housing 172 has an internal surface complementary in configuration with the top surface of the projection 154. The remaining aspects of this embodiment are substantially the same as the embodiment of FIG. 11.

Figure 13:
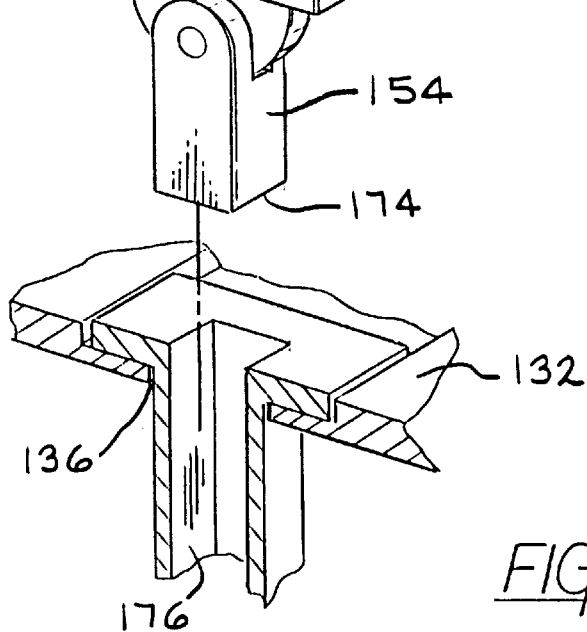
FIG. 13 is an enlarged view of yet another alternative embodiment of the subject invention.

FIG. 13 shows yet another embodiment of the projection 154 wherein the projection 154 is a polygonal finger 154 having a flat distal end 174. A polygonal sleeve 176, which is complementary in configuration to the polygonal finger 154, is disposed within the opening 136 in the support sheet 132 for receiving the polygonal finger 154 of the seat pan 148. In the embodiment shown, the polygonal finger 154 and polygonal sleeve 176 are squares.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A seat bottom assembly for a vehicle comprising:

a support sheet having at least one aperture formed therethrough, a seat pan having a first section and a second section disposed above said support sheet for supporting an occupant, at least one projection extending from said seat pan for engaging said at least one aperture in said support sheet, and at least one bladder disposed between said support sheet and said seat pan, wherein one of said first and second sections of said seat pan may move relative to said support sheet.

2. An assembly as set forth in claim 1 wherein said at least one projection is pivotally connected to said seat pan for allowing selective pivotal movement of said first and second sections of said seat pan relative to said support sheet.

3. An assembly as set forth in claim 2 wherein said at least one projection is recessed in a projection housing mounted to said seat pan for limiting the pivotal movement of said at least one projection relative to said seat pan.

4. An assembly as set forth in claim 1 wherein said at least one projection is a cylindrical finger having a parabolic distal end.

5. An assembly as set forth in claim 4 including an annular sleeve disposed within said at least one opening of said support sheet for receiving said cylindrical finger of said seat pan.

6. An assembly as set forth in claim 1 wherein said at least one projection is a polygonal finger having a flat distal end.

7. An assembly as set forth in claim 6 including a polygonal sleeve complementary in configuration to said polygonal finger, said polygonal sleeve disposed within said at least one opening of said support sheet for receiving said polygonal finger of said seat pan.

8. An assembly as set forth in claim 1 including an integral recess formed within said support sheet with a motorized component disposed in said recess between said support sheet and said seat pan.

9. An assembly as set forth in claim 1 including a first bladder disposed between said support sheet and said first section of said seat pan for moving said first section relative to said support sheet and a second bladder disposed between said support sheet and said second section of said seat pan for moving said second section relative to said support sheet.

10. An assembly as set forth in claim 1 wherein said at least one projection is disposed between said first and second sections of said seat pan for allowing said seat pan to pivot about said at least one projection relative to said support sheet.

11. An assembly as set forth in claim 1 wherein said seat pan includes a recess and an occupant support member disposed in said recess for cushioning support of an occupant.

12. An assembly as set forth in claim 11 wherein said occupant support member comprises a flexible sheet suspended across said recess.

13. An assembly as set forth in claim 11 including a stylized seat bottom trim supported on said pan.

14. A seat bottom assembly for a vehicle comprising:

a support sheet having at least one aperture formed therethrough, a seat pan disposed above said support sheet, at least one projection pivotally connected to said seat pan and engaging said at least one aperture in said support sheet, and a pivoting mechanism for pivoting said seat pan relative to said support sheet.

15. An assembly as set forth in claim 14 wherein said seat pan includes a first section and a second section, and wherein said at least one projection allows selective pivotal movement of one of said first section of said seat pan and said second section of said seat pan relative to said support sheet.

16. An assembly as set forth in claim 15 wherein said pivoting mechanism comprises at least one inflatable saclike structure disposed between said support sheet and said seat pan for causing the selective pivotal movement of one of said first and second sections of said seat pan relative to said support sheet.

17. An assembly as set forth in claim 14 further including at least one sleeve complementary in configuration to said at least one projection, said at least one sleeve disposed within said at least one opening of said support sheet for receiving said at least one projection.

18. An assembly as set forth in claim 14 wherein said at least one projection is disposed between said a first section of said seat pan and a second section of said seat pan for allowing said seat pan to pivot about said at least one projection relative to said support sheet.

19. A seat bottom assembly for a vehicle comprising:

a support sheet having at least one aperture formed therethrough, a seat pan having a first section and a second section, at least one projection extending from said seat pan and engaging said at least one aperture in said support sheet for pivotally connecting one of said first and second sections of said seat pan to said support sheet, and means for causing relative selective pivotal movement between said support sheet and one of said first and second sections of said seat pan.

20. An assembly as set forth in claim 19 wherein said means for causing pivotal movement comprises a bladder disposed between said support sheet and one of said first and second sections of said seat pan.

* * * * *